No. 867,636. PATENTED OCT. 8, 1907.
W. BEESON.
BEEHIVE.
APPLICATION FILED MAR. 2, 1907.
2 SHEETS—SHEET 1.
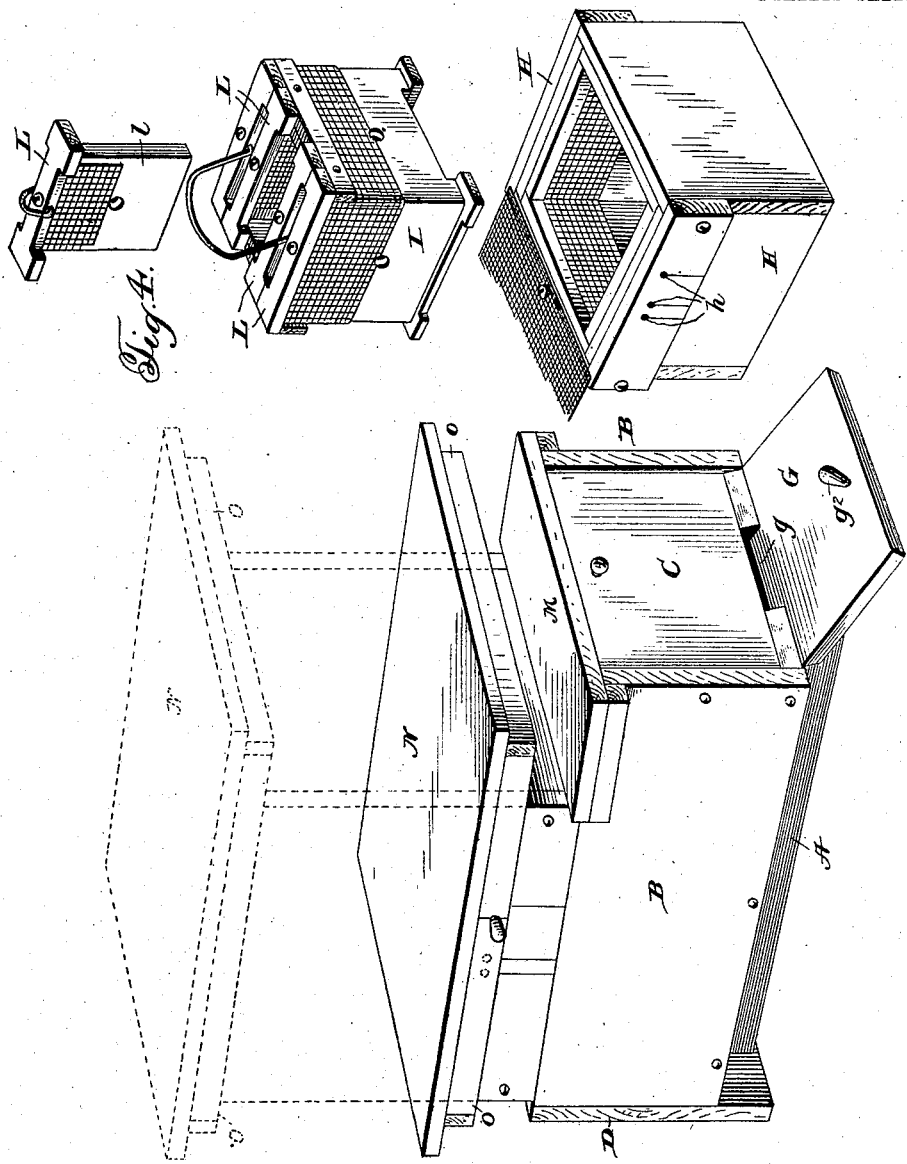

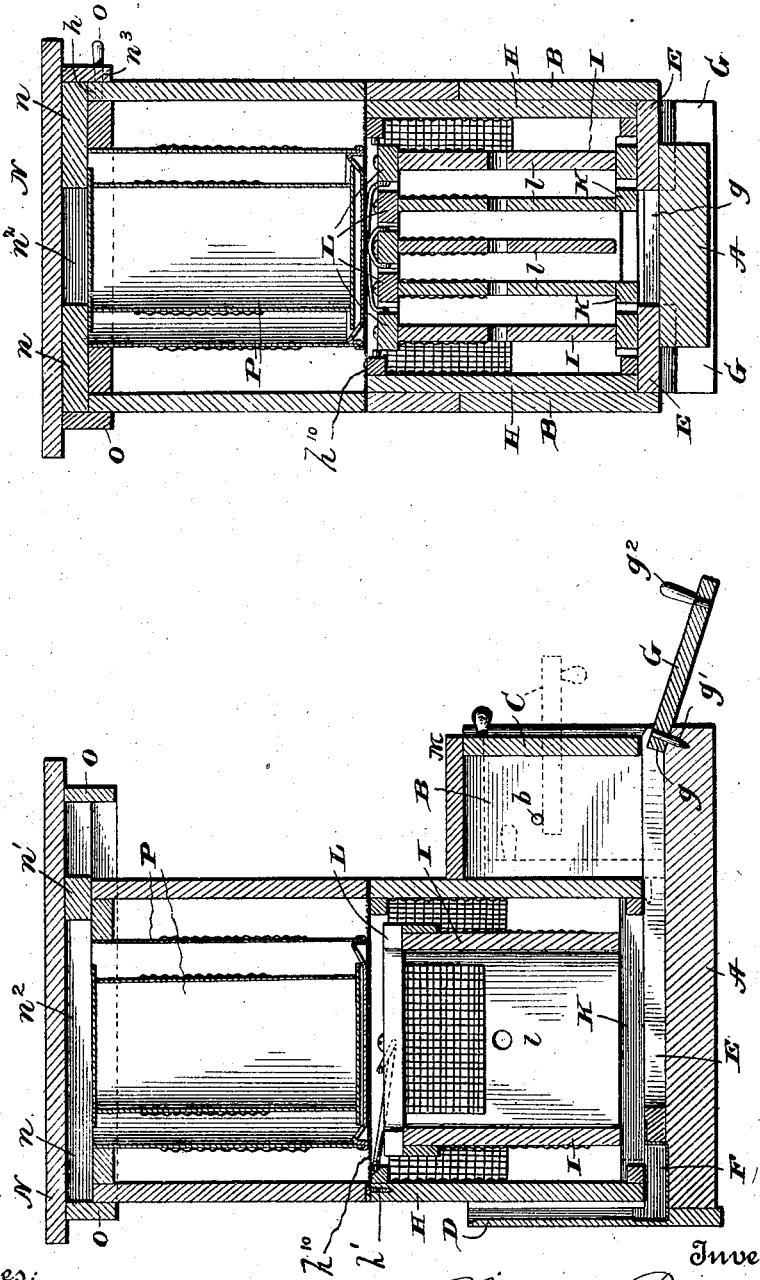

UNITED STATES PATENT OFFICE.

WILLIAM BEESON, OF GILTEDGE, MONTANA.

BEEHIVE.

No. 867,636.  Specification of Letters Patent.  Patented Oct. 8, 1907.

Application filed March 2, 1907. Serial No. 360,156.

*To all whom it may concern:*

Be it known that I, WILLIAM BEESON, of Giltedge, in the county of Fergus, and in the State of Montana, have invented a certain new and useful Improvement in Beehives, and do hereby declare that the following is a full, clear, and exact description thereof, reference being had to the accompanying drawings, in which—

Figure 1 is a perspective view of a bee hive embodying my invention; Fig. 2 is a longitudinal, vertical section of the same from front to rear; Fig. 3 a cross-section on the line 3—3 of Fig. 2; and, Fig. 4 a perspective view of two of the hive bodies or brood chambers and one of the brood frames separated from each other.

The object of my invention is to provide a bee hive of large comb capacity; capability of proper ventilation and control of ventilation and maintenance of normal temperature in the brood chamber; economical of management in enabling the production of surplus honey at a minimum cost; and easy and convenient of manipulation, and thus labor-saving, and to these ends my invention consists in the bee hive having the features of construction substantially as hereinafter specified and claimed.

In the embodiment of my invention illustrated in the drawings, I employ a bottom board that consists of a base or bottom piece A, upon which is fastened a rectangular frame comprising parallel side walls B and front and back walls C and D, respectively, the base being much narrower than the frame, and the bottom of the latter where it projects beyond the sides of the base being closed by floor pieces E, each of which, at its inner edge, partially overlaps the top of the base A, a comparatively wide space being left between said floor pieces so that an opening for the passage of bees is left at the front of the bottom board between the front wall C and the base A. At the back end of the bottom board, in a space between the floor pieces, is a feed pan F.

The front wall C of the bottom board is pivotally attached at its ends to the two sides B, so that, at will, it may be turned from a vertical position to a horizontal position (as indicated in dotted lines in Fig. 2) to provide separate upper and lower passages to and from the hive to divide the bee flight, the bees leaving the hive doing so by passing over the upper side of said end wall when in a horizontal position, and the bees entering the hive passing beneath the same. The front wall C, when swung to a horizontal position, as described, is also available as a shelf that is useful when the hive is being opened. Preferably, to stop the front wall C in a horizontal position when it is swung thereto, a projection $b$ is provided on the inner side of one or both of the bottom board side walls B.

An alighting board G is provided by me, which consists of a rectangular board having projecting from one edge an offset $g$ to enter the space between the two bottom board floor pieces and rest upon a downwardly and outwardly inclined surface from the upper side of the front end of the base A, to which it is detachably attached in a downwardly and outwardly inclined position, as by means of a dowel pin $g'$ that enters a suitable hole in the base A. The alighting board is useful, as hereinafter described, for closing the hive in winter, and near its front edge, on its top, it is provided with a handle $g^2$, by which it may be conveniently caught hold of.

My brood chamber is formed by a plurality of nested or telescoping hive bodies or boxes, which may be of any desired form, but, as I prefer, are square or rectangular in form, and of such relative sizes that when nested or telescoped, spaces will exist between them for brood comb. By this construction, I secure a great increase of comb space over the ordinary arrangement of brood chamber, in which frames in a single hive body or case are employed. I show in the drawing two hive bodies or boxes, an outer one H and an inner one I. On the inner surface of the outer body at the top thereof, and on the outer surface of the inner body at the top thereof, comb foundation is attached, as by pasting with candy or honey, etc. Projecting from the inside of each side of the outer body H at the top thereof is a flange or rim that serves to properly position the nested bodies when placed one within the other, and at the bottom of the outer body there is a similar ledge or flange and a pair of bars K run from such ledge at one side of the body to the opposite side, which bars serve to support the inner hive body, which on its bottom has similar bars that lie alongside of and parallel with the bars K, all the bars being notched or cut-away on one side to provide bee passages.

In the central chamber which is formed by the inner hive body I, I place removable frames which comprise a top bar L, whose ends rest on opposite sides of the inner hive body I, and a board $l$ fastened to and depending from the bar and constituting a core, so to speak, to which on each side, at the top, comb foundation is pasted. These frames are employed by me to facilitate transferring nuclei.

It will be seen that, by the construction of brood chamber I have described, I provide an enormous comb surface, and that the central chamber is maintained at a uniform temperature, the building of brood comb proceeding from such chamber outward. It will be seen that by reason of the square form of the hive bodies, they can be shifted about with reference to each other a quarter turn at a time, so that the bee force may be located at will at desired points.

I preferably make the bottom board oblong in shape, so that the hive bodies when in position therein will only fill the space crosswise between the bottom board sides B—B, leaving a vestibule-like space at the front of the bottom board, and I close the space at the top by a removable cover M that consists of a strip of suitable dimensions which extends across from one side board B to the other, and has at each end on its under side an outwardly projecting ledge or flange to fit over the outer side of the bottom board side. Said cover M, is useful as a shelf or table. For wintering, the alighting board is removed from its position at the front of the hive and placed in a vertical position in the vestibule against the front side or wall of the outer body H with its projection $g$ extending down into and closing the space between the two floor pieces of the bottom board, it being secured in such position by a dowel pin $g'$ that enters a hole in the front wall of the outer hive bottom.

My top cover consists of a top N formed of a board or boards and a rectangular frame O which corresponds to the lateral dimensions of the hive, but is longer than the latter from front to rear, and on the underside of the top N at opposite sides thereof are two filling pieces $n$ between which is a space that extends longitudinally of the top cover, and is divided transversely by a crossbar $n'$ near the front end of the top cover into two sections of unequal length, one $n^2$ being about equal to the dimensions of the hive body from front to rear. When the top cover is shifted as far forward as it can be, there is no communication between the interior of the hive and the outside atmosphere through the space $n^2$, and this is the condition desired in the spring of the year; while, when it is shifted to an intermediate position which will carry the cross bar $n'$ slightly to the rear of the front wall of the hive body, communication between the interior of the hive and the outside atmosphere at the top will exist at both the front and the rear end of the top cover, which is the condition desired in summer. In the adjustments of the top cover for both spring and summer, the hive entrance is open, and, as will be evident, there will be a freer circulation of air in the hive in summer when it is warm than is desirable in the cooler spring. When the top cover is shifted as far rearward as it can be, which is the position desired for wintering, the top of the hive is placed in communication with the outside atmosphere through the top cover space $n^2$ at the rear of the hive, and this is the only communication between the interior of the hive and the atmosphere in winter, as, at such time, the entrance to the hive is tightly closed, as by means of the alighting board, as hereinbefore described. I thus secure top ventilation of the hive in winter, which experience has shown to be the most advantageous, as it insures the evacuation of moisture from the hive, with no circulation of cold air therein, and the hive is maintained at a higher temperature.

Suitable means are provided to fix the top cover in its various positions of adjustments, as, for example, a pin $O'$, which passes through a hole $n^3$ in one of the side flanges of the top cover and into any one of three holes $h$ of the outer hive body H, which holes are located to fix the position of the top cover for the various seasons. Over the top of the hive bottom H is a cover $h^{10}$ of wire cloth, to prevent the bees from filling the air space with bur and brace comb, to serve as a protection against robber bees and to enable inspection of the hive by removal of the top cover, without permitting bees flying out. To prevent said cover $h^{10}$ being lost or misplaced, or moved when the top cover is slid back and forth in adjusting it, said cover $h^{10}$ is secured at one point to the hive body H by a screw $h'$ which forms a pivot on which the wire cloth cover may be swung into and out of place. The cover $h^{10}$ is not used when it is desired that the bees shall store surplus honey in the super.

For producing comb honey, any standard super may be tiered on, but, for obtaining surplus honey that is to be extracted, as I employ surplus honey sections that are cylindrical or drum-form in shape, I prefer to make the super round or cylindrical, although it may be made rectangular to conform to the rectangular shape of the outer body of the brood chamber. If made round, the super is provided with a flanged rim at its bottom to conform to the shape of and fit over the rectangular top of the hive body H. The cylindrical or drum form super sections P, one inside the other telescopically, are stood on end on the top of the brood chamber. The cylindrical super sections are hollow, but I force comb building only on the outside thereof, and I do this by leaving the space on the interior of the sections too small for comb building, and varnish the inner surface, using, for example, a composition composed of equal parts of lard, kerosene and sulfur. As the honey flow is at a season when cold weather does not have to be reckoned with, I make my super sections of some light, cheap material, such as paper, sheet metal or the like; and, as bees prefer to work vertically rather than sidewise, I make my supers high, rather than multiply them. The uncapping of the comb on the exterior of the sections can be very readily done.

When in position in the apiary, the bottom board is placed level on the ground, and to keep it dry, sand is tamped under it where the floor pieces overhang the base piece.

It will be evident from the illustration and description of my hive that, by reason of the provisions which it contains for control or regulation of ventilation, it is adaptable for all seasons of the year; that its interior is independent of extremes of outside temperature; that, as far as can be regulated or controlled by hive construction it is non-swarming, and that it is labor-saving by reason of its convenient construction for manipulation.

It is to be understood, of course, that while all the features of my hive which I have described may be embodied in a single hive, and coöperate to produce the objects of my invention, it is not necessary to combine them all in one hive, and, therefore, the scope of my invention is to be understood as extending to the employment of any number of the novel features of my hive in a single hive.

Having thus described my invention, what I claim is:

1. A bee hive, having a plurality of nested or telescoping boxes, separated to provide comb spaces between the walls of adjacent boxes the hive being constructed to give the bees access to such comb spaces.

2. A bee hive, having a plurality of nested or telescoping boxes, separated to provide comb spaces between the walls of adjacent boxes, said boxes being shiftable relative to each other, so that at different times they may be in different relative positions the hive being constructed to give the bees access to such comb spaces.

3. A bee hive, having a plurality of nested or telescoping boxes, separated to provide comb spaces between the walls of adjacent boxes, said boxes being shiftable relative to each other, so that at different times different side walls may be near each other the hive being constructed to give the bees access to such comb spaces.

4. A bee hive, having a plurality of nested or telescoping boxes, separated to provide comb spaces between the walls of adjacent boxes, the innermost box having a chamber for brood frames the hive being constructed to give the bees access to such comb spaces.

5. A bee hive, having a plurality of nested or telescoping boxes, separated to provide comb spaces between the walls of adjacent boxes, said boxes having at their bottoms bars that lie alongside each other between which are bee spaces.

6. A brood frame comprising a solid comb supporting core, and means for supporting such core.

7. The combination of a brood chamber and brood frame consisting of solid comb supporting cores, and means for supporting cores in the brood chamber.

8. A bee hive having an air-admitting opening in its lower part, and a top cover that is shiftable horizontally to vary a means of communication between the top of the hive and the external atmosphere.

9. The combination of a bee hive, and a top cover that is shiftable horizontally to control means of communication between the interior of the hive and the external atmosphere.

10. The combination of a bee hive, and a top cover having in its underside a space forming an air passage, said top cover being shiftable to different positions to change the position of such air space relative to the interior of the hive.

11. A bottom board for bee hives having side walls longer than the hive body from front to rear, whereby a vestibule-like space is provided at the front of the hive body, said bottom board having a front wall that is shiftable from a vertical to a horizontal position in said vestibule its horizontal position being above the floor and providing bee passages above and below it.

12. A bottom board for bee hives comprising a base piece and floor pieces at opposite sides of the base piece, between which, above the base piece, is a space, and said floor pieces extending from front to rear and projecting beyond the sides of the base so that beneath the floor pieces there is a space on either side of the base piece.

13. A bottom board for bee hives, comprising a base piece and floor pieces at opposite sides of the base piece, between which is a space said floor pieces extending from front to rear, and projecting beyond the sides of the base.

14. A bottom board for bee hives comprising a base piece, floor pieces at opposite sides of the basepiece, side walls arising from said floor pieces, a rear wall, and a horizontal frontwall shiftable to different positions.

15. The combination of a bottom board having side walls, a hive shorter than the side walls, from front to rear whereby a space exists in front of the hive in the bottom board, and an alighting board shiftable from its position at the front of the bottom board to a position in said space next the front of the hive.

16. The combination of a bottom board having side walls, a hive in the bottom board shorter than the bottom board, from front to rear whereby a vestibule-like space exists in the bottom board at the front of the hive, the bottom board having a passage leading beneath the hive, and an alighting board having a projection fitting such passage and shiftable from a position at the front of the bottom board to a position at the front of the hive with its projection extending in said passage.

17. The combination of a bottom board having side walls, a hive, the bottom board having a vestibule-like space in front of the hive between the side walls, and a removable cover for the top of said vestibule-like space resting on said side walls and having a projection engaging each side wall.

In testimony that I claim the foregoing I have hereunto set my hand.

WILLIAM BEESON.

Witnesses:
 R. A. McKEE,
 K. E. HODGES.